Oct. 7, 1958

W. F. KING 2,855,527

ELECTRIC COUPLING

Filed May 14, 1956

William F. King,
Inventor.
Koenig and Pope,
Attorneys.

Oct. 7, 1958  W. F. KING  2,855,527
ELECTRIC COUPLING
Filed May 14, 1956  2 Sheets-Sheet 2

William F. King,
Inventor
Koenig and Pope,
Attorneys.

United States Patent Office 2,855,527
Patented Oct. 7, 1958

2,855,527

ELECTRIC COUPLING

William F. King, Wauwatosa, Wis., assignor to Eaton Manufacturing Company, Cleveland, Ohio, a corporation of Ohio Application May 14, 1956, Serial No. 584,633

1 Claim. (Cl. 310—105)

This invention relates to electric couplings, and with regard to certain more specific features, to eddy-current slip couplings.

Among the several objects of the invention may be noted the provision of an arrangement of parts in couplings of the class described, by means of which a loose subassembly of a housing and inductor drum of either a water-cooled or air-cooled type may be organized conveniently either (a) with the flange of a standard motor (a shaft of which is axially centered by the motor to support said inductor drum) or (b) with a subassembly of an end bell having an outboard bearing centering arrangement for a shaft supporting said inductor drum; the provision of such a coupling in which either the assembly of housing, inductor drum and standard motor, or the assembly of the same housing, inductor drum, end bell and shaft, may be brought into accurately aligned completely piloted assembly with a subassembly constituted by a second end bell having a partial bearing support for a second shaft and a rotary field member thereon; the provision of a coupling of the class described in which an accurate pilot bearing alignment between shafts is obtained either when the device is assembled with said motor or with said end bell and outboard bearing arrangement; and the provision of an arrangement of the class described permitting the production of various high-quality rigidly aligned assemblies from a small number of parts at low cost. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section, partly in elevation, showing the parts of the invention assembled with an end bell and outboard bearing arrangement and adapted for liquid cooling;

Corresponding reference characters indicate corresponding parts throughout the several views of the drawings.

Hereinafter, various subassemblies and complete assemblies will be referred to by the letters A, B, C and D, as indicated on Fig. 1; or A, B, C–1 and D–1, as indicated on Fig. 2; or A–1, B–1, C and D–2, as indicated on Fig. 3.

Figures 1, 2:
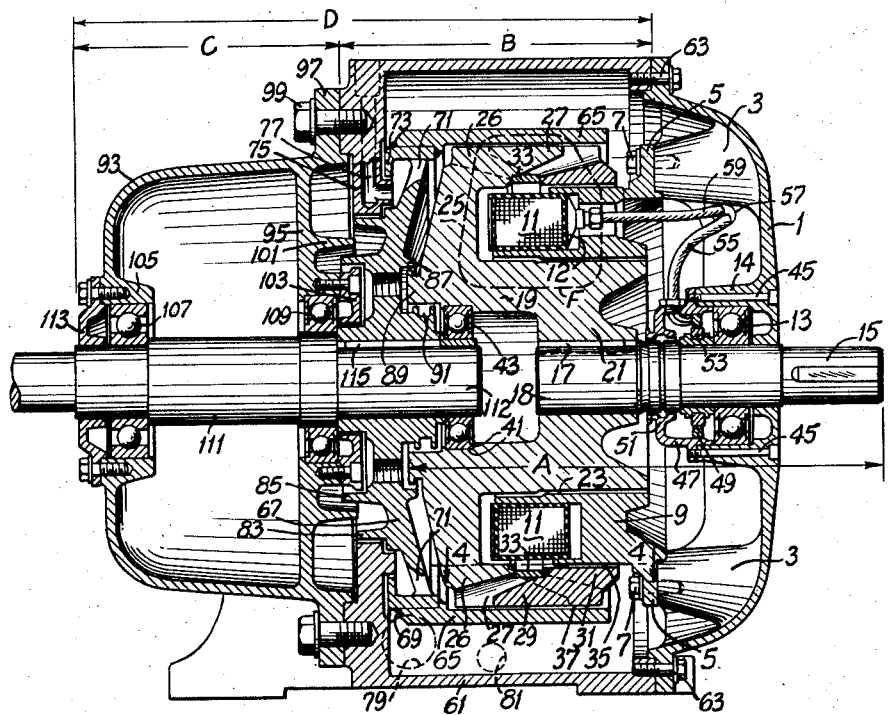
Fig. 2 is a view similar to Fig. 1, but showing the parts of the invention assembled with a standard-flange motor, some parts being shown in elevation.

Referring now more particularly to Fig. 1, A shows a subassembly consisting of an end bell 1 having inside supporting pads 3 for a ring 5 attached thereto by bolts 7. The ring 5 is part of an annular magnetizable (iron) coil support sleeve 9 which carries an annularly wound exciter coil 11. Coil 11 is located within a watertight encasement 12. In the end bell 1 is a sleeve 14, carrying a bearing 13 for a driven shaft 15 to which is keyed at 17 a magnetizable polar field member 19. Member 19 consists of a hub 21 located within sleeve 9 and forming therewith an inner magnetic gap at 23. A radial portion 25 extends from hub 21 adjacent coil 11 and supports a first pole ring 26. From the pole ring 26 extend spaced magnetizable polar teeth 27 which interdigitate with spaced magnetizable polar teeth 29 extending from a second pole ring 31 which forms an intermediate magnetic gap 35. A non-magnetizable (copper, for example) ring 33 is welded to and mechanically joins the pole rings 26 and 31 but magnetically separates them. The outer faces of the spaced interdigitated polar teeth 27 and 29 are cylindrically machined to form an outer magnetic gap 37 with an inductor drum 65, later to be described in another connection. The field member 19 is counter-bored and shouldered, as shown at 41, for the reception of a pilot bearing 43. As the drawings show, the field member parts envelop coil 11 and ring 9 within a general C-shape in axial section.

Telescoping the inner end of the central sleeve 14 of end bell 1 (and held thereto by bolts 45) is a cap 47, which has three functions, i. e., first, to hold in place the outer race of the bearing 13; second, to support the stator 49 of a permanent-magnet A. C. generator; and, third, to form a bearing seal 51. The permanent-magnet rotor of the generator is indicated at 53, the same being attached to the shaft 15. A line 55 leads from the stator 49 to the outside of the machine through an opening 57. An electric supply line 59 enters the opening 57 and is connected to the coil 11. A suitable electrical control circuit (not shown) interconnects lines 55 and 59.

Most of the parts thus far described may be organized as a subassembly A. Thus the coil 11 may be placed on the sleeve 9 and the ring 5 bolted to the pads 3 of the end bell 1. The field member 19 may be keyed to the shaft 15 and the A. C. generator parts 51, 53 and bearing 13 then slipped over the end of the shaft. The assembly of parts 19, 51, 53 and 13 then may be brought together with the end bell 1, the bolts 45 being drawn up. This organization of parts constitutes subassembly A.

Another subassembly B is constituted by a casing 61, adapted to be attached to the end bell 1 by bolts 63. Within this casing is a magnetizable inductor drum 65, having an inside cylindrical surface which, with the outside cylindric form of the teeth 27, 29, forms said outer magnetic gap 37. The drum 65 is fixed upon the rim of a conical hub 67, the attachment being made by welding, as shown at 69. At the periphery of the hub 67 are openings 71 and an inwardly directed marginal flange 73, forming a coolant catch and a running seal with an inwardly directed portion 75 of the casing 61. A liquid inlet 77 permits the introduciton of coolant within the catch, such as water or the like, for movement under centrifugal force through the openings 71 and through the outer magnetic gap 37. An outlet 79 at the bottom of the casing permits water to escape after gravitating from the open end of drum 65. Numeral 81 designates an opening for the insertion of a thermometer for measurement of coolant temperatures.

The hub 67 includes a running sealing means 83 with an inwardly directed portion 75 of the housing. It includes a second running sealing means 85 for cooperation with parts to be described in connection with another subassembly. It also includes a running sealing means 87 for cooperation with the running sealing means 89 on the field member 19. An additional running sealing means 91 cooperates with a part of the counterbore 41. In view of the above, it will be seen that subassembly B, which is more or less loose, is constituted by the casing 61 and the inductor drum parts 65 and 67.

Another subassembly C is constituted as follows: An end bell 93, having an inner wall 95 and an outer flange 97, is adapted to be bolted to the casing 61 by means of bolts 99. Attached to the inner wall are running sealing means 101 and 103, adapted to cooperate with the running sealing means 85. Sealing means 103 is detachable, so as to admit the insertion of an inboard bearing 109. The end bell 93 is elongate axially and extends substantially from the wall 95 to provide an outboard support 105 for an outboard bearing 107. Bearings 107 and 109 completely support and align a drive shaft 111. Prior to bolting the flange 97 to the casing 61, the shaft 111 may be assembled in the bearings 107, 109, the sealing means 103 being at this time attached. A bearing cap 113 at this time is attached to the support 105.

To effect a complete assembly, the subassembly C is organized with the subassembly B to form a subassembly D, this being accomplished by first inserting the cup-shaped inductor organization of parts 65, 67 through the right-hand open end of casing 61 and placing the member 67 within the inwardly directed portion 75. Then the subassembly B is brought into juxtaposition with subassembly C, shaft 111 being inserted into the central opening provided in the hub 67 and keyed, as shown at 115. This brings the flange 97 into position on the end of the casing 61, and bolts 99 are inserted and drawn up.

Subassembly D is now in the condition to be assembled with subassembly A either by applying bearing 43 to shaft 111 or inserting it into the counterbore 41. Then the field member 19 is telescoped into the inductor drum 65, the prior assembled end bell 1 being brought into position with the casing 61 and the bolts 63 fastened.

The operation of the device will be clear to those skilled in the art. When shaft 111 (considered as the drive shaft) is rotated and coil 11 is excited, a toroidal flux field diagrammatically indicated at F is produced around the coil and interlinks the polar field member 19 and inductor drum 65. The eddy currents resulting from relative motion between the field member 19 and drum 65 cause reactive flux fields which accelerate the field member which, being attached to the shaft 15, accelerates it. A steady-state driving condition from shaft 111 to shaft 15 is reached with some rotary slip. The amount of slip depends upon the degree of excitation of the coil 11 and the load on the shaft 15. In the above description of operation, it is assumed that a suitable driving means is attached to the drive shaft 111, this in many cases being supplied by the customer purchasing the apparatus.

In some cases a customer has no driving means or prefers a standard integral driving motor to be supplied by the manufacturer. In such event a motor M, having a standard flange 117, is employed instead of the subassembly C. This motor M has a standard drive shaft 119, the inner end dimensions of which are the same as the dimensions of the inner end 112 of shaft 111. The bolt circle which was established for bolts 99 for attaching subassembly C is the same as the standard bolt circle on the motor M. Thus shafts 111 and 119 are interchangeable. Where the motor M is desired to be attached, the subassembly B is brought into assembly with flange 117 and shaft 119 of motor M, that is, with subassembly C–1 (Fig. 2). The result is subassembly D–1 which is then in condition to be assembled with subassembly A.

All numerals on Fig. 2 that are the same as those on Fig. 1 indicate identical parts in the various subassemblies. Thus it will be seen that the manufacturer is in a position to furnish at minimum cost couplings with or without a standard motor such as M. When the motor M is not employed the end bell 93 provides an outboard bearing for as rigid alignment of the drive shaft 111 as is provided by the spaced bearings in the motor housing for shaft 119. Moreover, the drive shaft, whether it be 111 or shaft 119 of motor M, is accurately piloted at the bearing 43 within the counterbore 41 of the field member 19.

Figure 3:
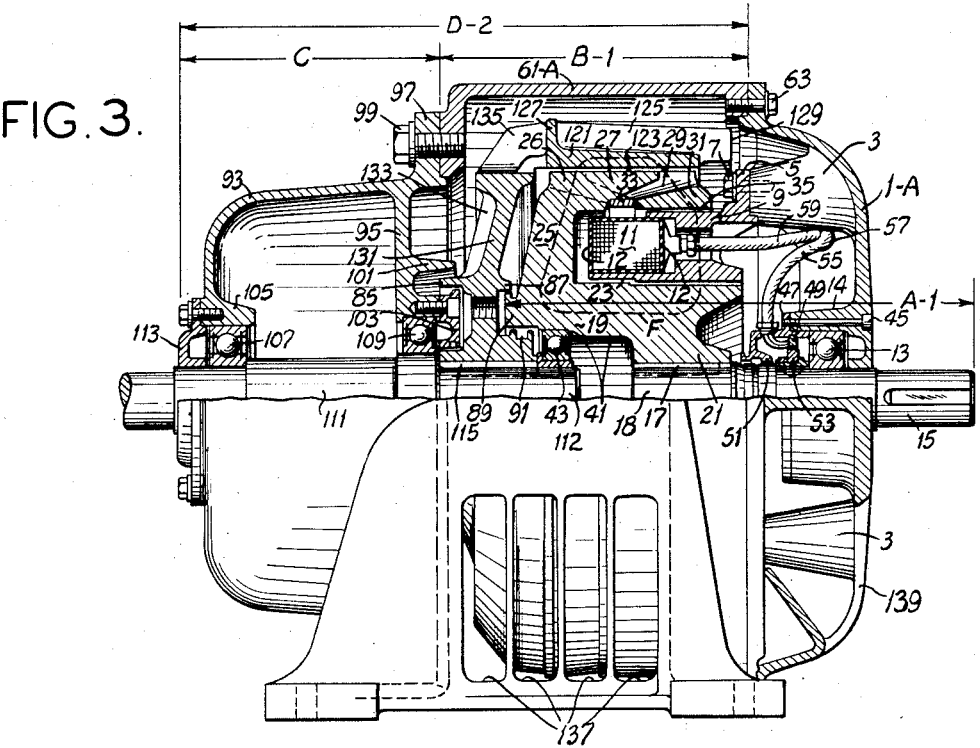
Fig. 3 is a view similar to Fig. 1, showing the parts adapted to air cooling; and, Fig. 4 is a fragmentary developed section taken on line 4—4 of Fig. 1.
Figure 4:
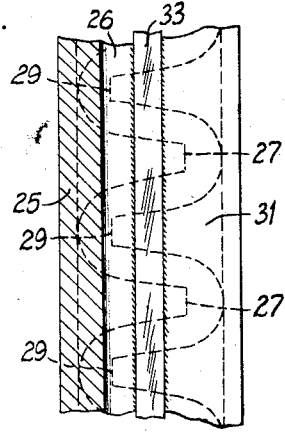

Referring now more particularly to Fig. 3, it will be seen how applicant's arrangement of parts also permits of an assembly adapted to air-cooled operation rather than employing a liquid coolant, with or without a motor drive. In this case the subassembly C is the same as that described in connection with Fig. 1, and is accordingly lettered on Fig. 3. There are only slight differences as regards subassembly A, which is indexed A–1 on Fig. 3. This difference resides in the fact that an air inlet opening 139 is provided in the end bell 1–A in Fig. 3 and air outlet openings are provided in the housing part 61–A. Otherwise, subassembly A–1 in Fig. 3 is the dimensional equivalent of subassembly A in Figs. 1 and 2.

Subassembly B of Figs. 1 and 2 is somewhat modified to become subassembly B–1 in Fig. 3 by changing portions of the inductor member and housing in order to convert to air cooling, but otherwise the parts of subassembly B–1 are the same as those of subassembly B and are so lettered. Thus the inductor drum in Fig. 3 is constituted by a cylindric drum 121 providing, with the polar teeth 27 and 29, the outer gap. This drum 121 is provided with outer cooling ribs 125 extending from a flange 127 to overhanging fan portions 129. Numeral 131 indicates the inductor hub, the inner portions of which are the same as the hub described in connection with Figs. 1 and 2, in this respect being lettered the same. However, the hub 131 is provided with additional cooling fins 133 and is also attached to the drum 121 by means of spaced arms 135. The casing 61–A (except for the openings 137) is the same as casing 61 in Figs. 1 and 2, and has lettered the same its various other parts which are the same as those of casing 61.

The air outlet openings 137 are provided so that air flow induced through the inlet opening 139 by the rib-like members 125, 133 and 135 is interiorly circulated and blown out through the openings 137. It will be observed that air entering opening 139, passes to openings 127 via the gaps 23, 35 and 37, as well as around the drum 121, passing also between the polar teeth 27 and 29, thus effecting efficient cooling in the gaps and around the coil 11.

It will be understood that if it is desired to apply a standard motor such as shown at M in Fig. 2 to the air-cooled construction shown in Fig. 3, this may be accomplished by interchanging the subassembly C of Fig. 3 for the motor subassembly C–1 of Fig. 2. This interchange is not shown in the drawings, since its result will be obvious from the above description.

It will be observed that the substantially spaced bearings 107, 109 in the end bell 93 provide for rigid alignment of the shaft 111, as do also the bearings of motor M for its shaft. Thus the inwardly extending and overhanging stub end portion 112 of shaft 111 is as rigidly supported by the end bell 93 as is the inwardly projecting portion of shaft 119 of the interchangeable motor M. The bearing means 13 in the end bell does not in and of itself completely support and align the inwardly extending portion 18 of shaft 15. But said inwardly extending portion 18 is supported by bearing 43, carried on the rigid inwardly extending portion 112 of shaft 111, or on portion 119 of the motor shaft, as the case may be. Thus not only are the elongate end bell 93 and motor M interchangeable, but either one of them provides an inwardly extending pilot bearing support for the inwardly extending portion 18 of shaft 15 through bearing 43. Since shaft 15 carries the field member 19, the bearing 43 aids bearing 13 in accurately supporting member 19 to maintain accuracy at the magnetic gaps 23, 35 and 37. Substantial accuracy is here necessary, since such gaps are small, as, for example, .020 inch.

In view of the above, it will be seen that the first end bell 93 with the flange 97, wall 95 and shaft 111 may be referred to as a first subassembly. The second subassembly is constituted by the casing or housing 61, having the inwardly directed portion or end 75 on which is the bolt circle for the bolts 99 for interchangeable attachment either to the flange 97 of the end bell 93, or to the motor flange 117, this second subassembly also including the cup-shaped inductor drum 65, with its inward radial portion or hub 67 adapted to be keyed either to the stub end of the shaft 111 or the shaft 119 of the motor. The third subassembly is constituted by the second end bell 1, the ring part 9 on which is the exciter coil 11, the driven shaft 15 and the polar field member 19 carried by the shaft. This third subassembly is adapted for attachment to the other end of housing 65 by the bolts 63.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

Electric coupling apparatus adapted to form a complete assembly of first, second and third subassemblies wherein said first subassembly and the flanged end of a driving motor may be interchangeably connected and the third subassembly may be connected with the stub end of the motor shaft, said first subassembly and the motor to be selectively attached at a bolt circle the same as that of the motor flange; said first subassembly comprising a first end bell having an outer flange having a bolt circle the same as that of said motor flange, spaced first inboard and second outboard bearings carried by said first end bell, a drive shaft completely aligned and supported by said bearings and having a key-receiving stub end substantially the same as the key-receiving stub end of the motor drive shaft; said second subassembly comprising a housing having a first end having a bolt circle adapted for interchangeable attachment either to said flange of the first end bell or to said motor flange, a cup-shaped inductor drum adapted to be located within said housing and adapted to be keyed either to the stub end of said shaft in said first subassembly or to the stub end of said motor shaft; said third subassembly comprising a second end bell adapted for attachment to the other end of said housing, an annular field coil attached to said second end bell, a driven shaft, a third bearing partially supporting the driven shaft in said second end bell, a pole-forming member keyed to said driven shaft and having a portion adapted for axial insertion between said field coil and inductor drum, said pole-forming member being also adapted for insertion into said inductor drum when said second end bell is attached to said housing; and a fourth pilot bearing which upon complete assembly is located radially between said pole-forming member and the stub end of either of said shafts and which is also located axially within said cup-shaped inductor drum, said third and fourth bearings upon complete assembly being adapted to align the driven shaft with either the drive shaft of the first subassembly or of said motor, as the case may be.

References Cited in the file of this patent

UNITED STATES PATENTS

| | | |
|---|---|---|
| 1,702,755 | Weydell | Feb. 19, 1929 |
| 2,345,850 | Winther | Apr. 14, 1944 |